(12) United States Patent
Kitaoka

(10) Patent No.: US 10,012,781 B2
(45) Date of Patent: Jul. 3, 2018

(54) LIGHTING DEVICE

(71) Applicant: PANASONIC INTELLECTUAL PROPERTY MANAGEMENT CO., LTD., Osaka (JP)

(72) Inventor: Shinichi Kitaoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/454,358

(22) Filed: Mar. 9, 2017

(65) Prior Publication Data
US 2017/0261192 A1    Sep. 14, 2017

(30) Foreign Application Priority Data

Mar. 10, 2016  (JP) .................................. 2016-047661

(51) Int. Cl.
| | | |
|---|---|---|
| *F21V 8/00* | (2006.01) | |
| *G02B 6/35* | (2006.01) | |
| *F21V 25/02* | (2006.01) | |

(52) U.S. Cl.
CPC .......... *G02B 6/0008* (2013.01); *G02B 6/354* (2013.01); *G02B 6/3574* (2013.01); *F21V 25/02* (2013.01)

(58) Field of Classification Search
CPC ..... G02B 6/0008; G02B 6/3574; G02B 6/354
See application file for complete search history.

(56) References Cited

U.S. PATENT DOCUMENTS

| | | | | |
|---|---|---|---|---|
| 4,270,839 A | * | 6/1981 | Cross | .................... G02B 6/2852 250/227.24 |
| 8,009,945 B2 | * | 8/2011 | Sudarshanam | ...... G02B 6/2852 385/134 |

FOREIGN PATENT DOCUMENTS

| | | |
|---|---|---|
| JP | 61-116313 | 7/1986 |
| JP | 03-001853 | 1/1991 |
| JP | 4101018 | 6/2008 |
| JP | 2008-305802 | 12/2008 |

* cited by examiner

*Primary Examiner* — Ryan Lepisto
(74) *Attorney, Agent, or Firm* — Greenblum & Bernstein, P.L.C.

(57) ABSTRACT

A lighting device configured to accommodate an optical fiber is provided. The lighting device includes a breaking structure which accommodates a portion of the optical fiber in a state in which the portion includes two or more bends. The breaking structure is configured to break and sever the portion of the optical fiber when the optical fiber is subjected to a load of a predetermined magnitude.

20 Claims, 10 Drawing Sheets

LIGHTING DEVICE

CROSS REFERENCE TO RELATED APPLICATION

This application claims the benefit of priority of Japanese Patent Application Number 2016-047661 filed on Mar. 10, 2016, the entire content of which is hereby incorporated by reference.

BACKGROUND

1. Technical Field

The present disclosure relates to a lighting device configured to accommodate an optical fiber.

2. Description of the Related Art

There are lighting devices that directly or indirectly utilize laser light. Such lighting devices directly emit, for example, blue light emitted by a laser and transmitted over a transmitting medium, such as optical fiber, or produce and emit white light by transmitting, over optical fiber, blue light from a laser and irradiating phosphor with the transmitted blue light.

However, with such lighting devices, when the optical fiber breaks, laser light can leak out and harm people. This necessitates the provision of a fail-safe mechanism for preventing laser light from leaking if and when the optical fiber breaks (for example, see Japanese Unexamined Patent Application Publication No. 2008-305802).

Japanese Unexamined Patent Application Publication No. 2008-305802 proposes an optical fiber self-breaking connector as a fail-safe mechanism. The optical fiber self-breaking connector can shift the axis of the optical fiber using heat generated by the optical fiber if and when a phenomenon occurs in which internal breakage of the optical fiber progresses due to, for example, heat generating as a result of the laser light collecting at a local bend in the optical fiber. In this way, the optical fiber self-breaking connector can prevent the laser light from advancing in the event that the above phenomenon occurs.

SUMMARY

However, the above conventional technique does not take into consideration an instance in which the optical fiber breaks upon being subjected to a physical load, such as when the optical fiber is pulled.

The present disclosure has been conceived in view of the above problem, and has an object to provide a lighting device including a fail-safe mechanism that prevents laser light from leaking upon the optical fiber being subjected to a load, such as when the optical fiber is pulled.

According to one aspect of the present disclosure, a lighting device configured to accommodate an optical fiber includes a breaking structure which accommodates a portion of the optical fiber in a state in which the portion includes two or more bends. The breaking structure is configured to break and sever the portion when the optical fiber is subjected to a load of a predetermined magnitude.

According to the present disclosure, a lighting device including a fail-safe mechanism can be realized that prevents laser light from leaking upon the optical fiber being subjected to a load, such as when the optical fiber is pulled.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

The following describes embodiments with reference to the drawings. Note that the embodiments described below each show a specific example of the present disclosure. The numerical values, shapes, materials, elements, the arrangement and connection of the elements, etc., indicated in the following embodiments are mere examples, and therefore do not intend to limit the inventive concept. Therefore, among elements in the following embodiments, those not recited in any of the independent claims defining the most generic part of the inventive concept are described as optional elements. Moreover, the drawings are represented schematically and are not necessarily precise illustrations.

Embodiment 1

(Lighting Device)

First, one example of the fail-safe mechanism according to this embodiment will be described.

Figure 1:
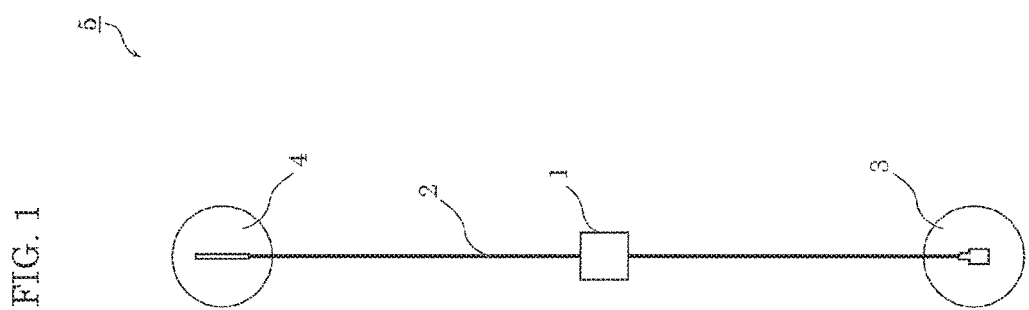
FIG. 1 illustrates one example of a lighting device including the fail-safe mechanism according to Embodiment 1.

FIG. 1 illustrates one example of lighting device 5 including fail-safe mechanism 1 according to Embodiment 1.

Lighting device 5 illustrated in FIG. 1 includes fail-safe mechanism 1, optical fiber 2, lighting fixture 3, and light source component 4.

In lighting device 5 configured to accommodate optical fiber 2, fail-safe mechanism 1 functions to prevent laser light from leaking when optical fiber 2 is subjected to a load, such as when optical fiber 2 is pulled. Details will be described later.

Optical fiber 2 is a transmitting medium that transmits light to a distant location. Optical fiber 2 is, for example, a fiber having a diameter of from approximately a few mm to tens of mm. In this embodiment, optical fiber 2 may be a core-type optical fiber configured of a protective-film covered two-layered structure of a core having a higher refractive index and a diameter of approximately 100 µm covered with a cladding layer having a lower refractive index, and may be an optical fiber cord configured of the core-type optical fiber further covered with an outer layer (sheath) made from composite resin, such as polyvinyl chloride (PVC). Both the core and the cladding layer are made of quartz glass or plastic which are highly transmissive to light.

Lighting fixture 3 is used for emitting light from light source component 4 transmitted via optical fiber 2 Lighting fixture 3 includes, for example, a stainless steel fiber coupling, a stainless steel ferrule, a glass lens, an aluminum holder, and an aluminum external body.

Light source component 4 includes a light source that emits a laser beam. Light source 4 emits light into optical fiber 2. In this embodiment, light source component 4 emits a blue laser beam having a diameter in a millimeter order of magnitude, such as approximately 1 mm, into optical fiber 2.

(Fail-Safe Mechanism 1)

Figure 2:
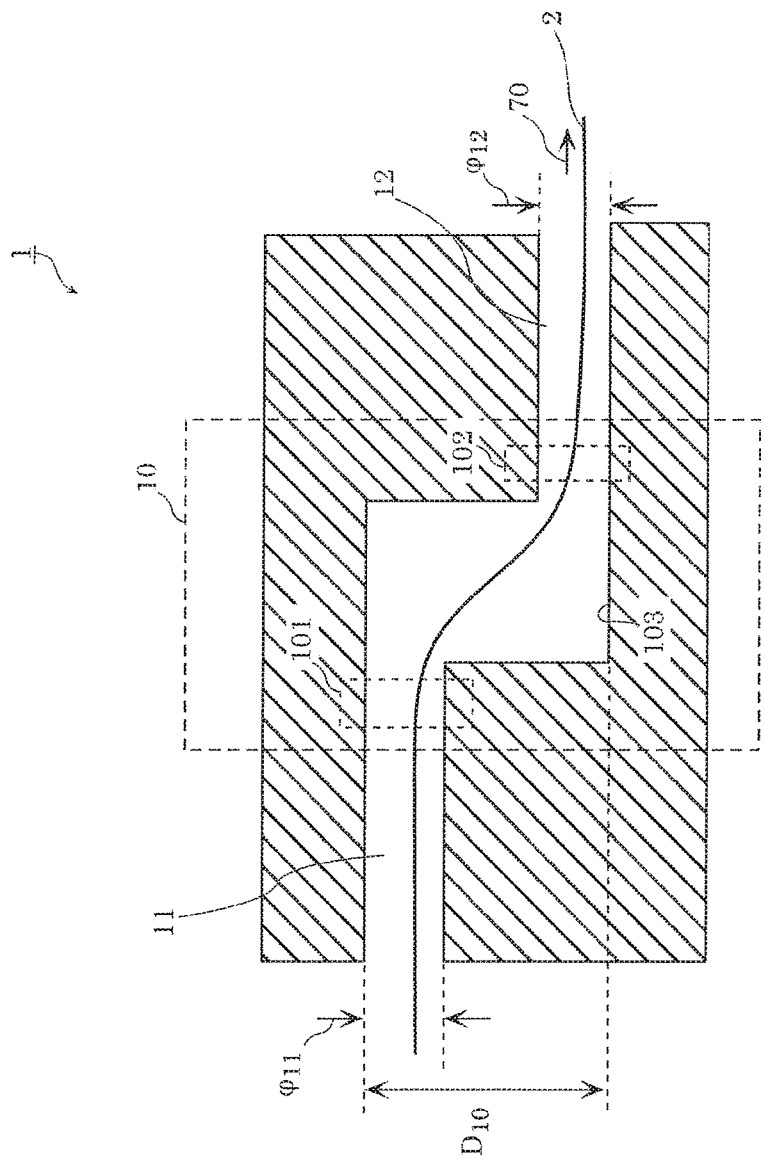
FIG. 2 is a cross sectional view of one example of the fail-safe mechanism according to Embodiment 1.

Next, the fail-safe mechanism according to this embodiment will be described in detail with reference to FIG. 2. FIG. 2 is a cross sectional view of one example of fail-safe mechanism 1 according to Embodiment 1.

Fail-safe mechanism 1 illustrated in FIG. 2 includes breaking structure 10, insertion through-hole 11, and extraction through-hole 12.

Breaking structure 10 accommodates a portion of optical fiber 2 in a state in which the portion includes two or more bends, and breaks and severs the portion when optical fiber 2 is subjected to a load of a predetermined magnitude.

More specifically, as illustrated in, for example, FIG. 2, breaking structure 10 includes space 103 including first aperture 101 and second aperture 102.

Space 103 defines a space in fail-safe mechanism 1 and includes first aperture 101 and second aperture 102. The space is defined by walls made of a material that shields laser light. Space 103 is in communication with hollow insertion through-hole 11 via first aperture 101, and in communication with hollow extraction through-hole 12 via second aperture 102.

Moreover, space 103 includes a location in which fail-safe mechanism 1 breaks and severs optical fiber 2 when a portion of optical fiber 2 is disposed in fail-safe mechanism 1. When optical fiber 2 is actually broken and severed, the walls defining space 103 prevent laser light from leaking out from the severed surface of optical fiber 2.

When a portion of optical fiber 2 is disposed in breaking structure 10, the portion passes through first aperture 101 and second aperture 102.

First aperture 101 is in communication with insertion through-hole 11. First aperture 101 has a diameter that is essentially the same size as the diameter of insertion through-hole 11, and is larger than the diameter of optical fiber 2. Second aperture 102 is in communication with extraction through-hole 12. Second aperture 102 has a diameter that is essentially the same size as the diameter of extraction through-hole 12, and is larger than the diameter of optical fiber 2. Note that first aperture 101 and second aperture 102 need not have the same diameter; for example, the diameter of first aperture 101 may be greater than the diameter of second aperture 102.

Moreover, distance $D_{10}$ from first aperture 101 to second aperture 102 in a view of space 103 from the perspective of first aperture 101 is greater than the sum of diameter $\varphi_{11}$ of first aperture 101 and diameter $\varphi_{12}$ of second aperture 102. With this, first aperture 101 and second aperture 102 can shift the axis of optical fiber 2 when the portion of optical fiber 2 is passed through first aperture 101 and second aperture 102.

When a portion of optical fiber 2 is disposed in breaking structure 10, the portion is inserted and passes through insertion through-hole 11. When a portion of optical fiber 2 is disposed in breaking structure 10, the portion is extracted and passes through extraction through-hole 12. As described above, insertion through-hole 11 is in communication with first aperture 101, and extraction through-hole 12 is in communication with second aperture 102.

In this embodiment, insertion through-hole 11 and extraction through-hole 12 are substantially parallel in the view of space 103 from the perspective of first aperture 101. In other words, insertion through-hole 11 and extraction through-hole 12 are provided such that the portion of optical fiber 2 disposed in breaking structure 10 takes the shape of a crank.

Since fail-safe mechanism 1 configured as described above allows for a portion of optical fiber 2 to be routed through insertion through-hole 11 and first aperture 101 as well as extraction through-hole 12 and second aperture 102, the axis of optical fiber 2 can be shifted by bending the portion of optical fiber 2 so as to include two or more bends and maintain optical fiber 2 in this state. With this, when optical fiber 2 is subjected to a load greater than or equal to a predetermined magnitude in the direction indicated by arrow 70, such as by being pulled, optical fiber 2 exceeds its critical radius of curvature in space 103 and is broken and severed. Fail-safe mechanism 1 can then aim the laser light emitting from the severed surface of optical fiber 2 broken and severed in space 103 toward a wall defining space 103. In this way, fail-safe mechanism 1 prevents laser light from leaking out when optical fiber 2 is subjected to a load, such as when optical fiber 2 is pulled.

(Advantageous Effects, Etc.)

As described above, according to this embodiment, lighting device 5, which is configured to accommodate optical fiber 2, includes breaking structure 10 which accommodates a portion of optical fiber 2 in a state in which the portion includes two or more bends. Breaking structure 10 is characterized in that it breaks and severs the portion when optical fiber 2 is subjected to a load of a predetermined magnitude.

Here, breaking structure 10 includes space 103 including first aperture 101 and second aperture 102, and when a portion of optical fiber 2 is disposed in breaking structure 10, the portion passes through first aperture 101 and second aperture 102. The distance from first aperture 101 to second aperture 102 in a view of space 103 from the perspective of first aperture 101 is greater than the sum of the diameter of first aperture 101 and the diameter of second aperture 102.

Moreover, breaking structure 10 further includes hollow insertion through-hole 11 in communication with first aperture 101 and hollow extraction through-hole 12 in communication with second aperture 102. When the portion is disposed in breaking structure 10, the portion passes through insertion through-hole 11 and extraction through-hole 12. Insertion through-hole 11 and extraction through-hole 12 are substantially parallel in the view of space 103 from the perspective of first aperture 101.

With this configuration, when a portion of optical fiber 2 is disposed in lighting device 5 according to this embodiment, the axis of optical fiber 2 can be shifted by bending the portion of optical fiber 2 so as to include two or more bends and maintain optical fiber 2 in this state. This makes it possible to prevent laser light emitting from the severed surface of optical fiber 2 from leaking out from space 103 when optical fiber 2 is broken and severed in space 103 upon being subjected to a load greater than or equal to a predetermined magnitude, such as by being pulled. In other words, lighting device 5 according to this embodiment includes a fail-safe mechanism that prevents laser light from leaking upon optical fiber 2 being subjected to a load, such as when the optical fiber is pulled.

This makes it possible to break and sever optical fiber 2 in a location where laser light cannot escape, before optical fiber 2 reaches a load that causes optical fiber 2 to break, such as by being pulled. This yields the advantageous effect of being able to ensure safety since laser light cannot escape, even when optical fiber 2 actually breaks.

Note that when an electrical and/or optical method of interrupting light output by detecting a break in optical fiber 2 (detection method) is used, laser light escapes for a slight amount of time. However, with lighting device 5 according to this embodiment, since it is essentially impossible for laser light to escape, there is an obvious advantageous effect even compared to the detection method.

Embodiment 2

In Embodiment 1, the fail-safe mechanism in lighting device 5 is exemplified as fail-safe mechanism 1, but the fail-safe mechanism is not limited to this example. In Embodiment 2, an example different from fail-safe mechanism 1 described in Embodiment 1 will be described. Note that since the overall configuration of lighting device 5 is the same as in Embodiment 1, description thereof is omitted. Moreover, the following description will focus points different from Embodiment 1.

(Fail-Safe Mechanism 1A)

Figure 3A:
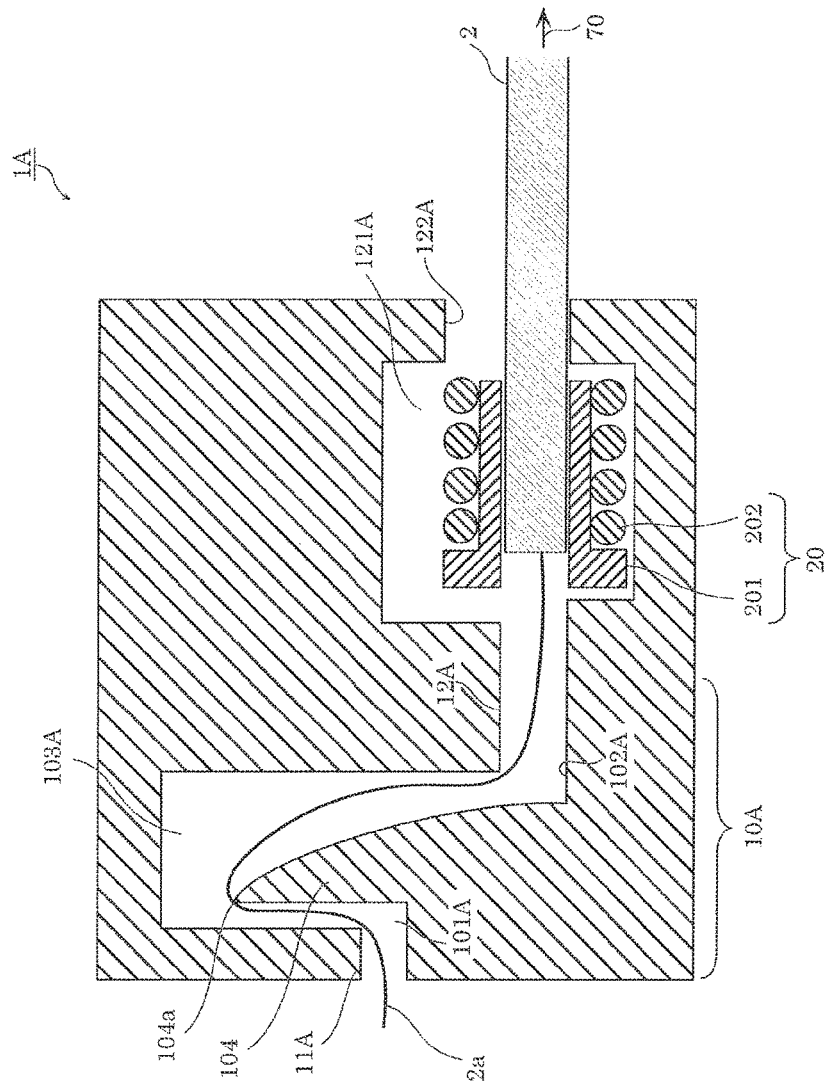
FIG. 3A is a cross sectional view of one example of the fail-safe mechanism according to Embodiment 2.

Next, fail-safe mechanism 1A according to this embodiment will be described in detail with reference to FIG. 3A. FIG. 3A is a cross sectional view of one example of fail-safe mechanism 1A according to Embodiment 2.

Fail-safe mechanism 1A illustrated in FIG. 3A includes breaking structure 10A, insertion through-hole 11A, extraction through-hole 12A, and load bearing component 20. Note that in this embodiment, the outer layer (sheath) of optical fiber 2 is held by load bearing component 20 (to be described later), and core 2a of optical fiber 2 is disposed in breaking structure 10A as "the portion" of optical fiber 2.

Breaking structure 10A accommodates core 2a of optical fiber 2 in a state in which core 2a includes two or more bends, and breaks and severs core 2a when optical fiber 2 is subjected to a load of a predetermined magnitude.

More specifically, as illustrated in, for example, FIG. 3A, breaking structure 10A includes space 103A including first aperture 101A and second aperture 102A.

Space 103A defines a space in fail-safe mechanism 1A and includes first aperture 101A and second aperture 102A. The space is defined by walls made of a material that shields laser light. Space 103A is in communication with hollow insertion through-hole 11A via first aperture 101A, and in communication with hollow extraction through-hole 12A via second aperture 102A.

Further, space 103A includes protrusion 104 having tip end 104a smaller than or equal in size to a critical radius of curvature of optical fiber 2. Tip end 104a is disposed on a path of core 2a of optical fiber 2 when core 2a is disposed in breaking structure 10A, and increases the number of bends in core 2a by at least one. In other words, when core 2a of optical fiber 2 is disposed in fail-safe mechanism 1A, space 103A bends core 2a in the vicinity of tip end 104a of protrusion 104. With this, when optical fiber 2 is subjected to a load greater than or equal to a predetermined magnitude in the direction indicated by arrow 70, such as by being pulled, core 2a of optical fiber 2 exceeds its critical radius of curvature in the vicinity of tip end 104a of protrusion 104 and is broken and severed. Further, the walls defining space 103A can prevent laser light emitted from the severed surface of core 2a of optical fiber 2 from leaking out.

Note that since first aperture 101A, second aperture 102A, insertion through-hole 11A, and extraction through-hole 12A have the same structure and function as first aperture 101, second aperture 102, insertion through-hole 11, and extraction through-hole 12 described above, description thereof is omitted.

Load bearing component 20 is provided in space 121A in communication with second aperture 101A. When core 2a of optical fiber 2 is disposed in breaking structure 10A, load bearing component 20 holds optical fiber 2 and converts the magnitude of the load to which optical fiber 2 is subjected into an amount of displacement.

In this embodiment, load bearing component 20 is provided in space 121A which includes third aperture portion 122A in communication with extraction through-hole 12A which continues to second aperture 101A. Here, the diameter of third aperture portion 122A is greater than the diameter of optical fiber 2, and when core 2a of optical fiber 2 is disposed in breaking structure 10A, core 2a passes through third aperture portion 122A.

Moreover, as illustrated in FIG. 3A, load bearing component 20 includes support 201 and spring 202. Support 201 is, for example, a sheath tube, and, when core 2a of optical fiber 2 is disposed in breaking structure 10A, holds the covering (sheath) of optical fiber 2. Moreover, when optical fiber 2 is under load, such as when optical fiber 2 is pulled, spring 202 converts the magnitude of the load to which optical fiber 2 is subjected into an amount of displacement of support 201 in the direction indicated by arrow 70 in FIG. 3A.

Since fail-safe mechanism 1A configured as described above includes breaking structure 10A which allows for core 2a of optical fiber 2 to be routed through insertion through-hole 11A and first aperture 101A as well as extraction through-hole 12A and second aperture 102A, the axis of optical fiber 2 can be shifted by bending core 2a of optical fiber 2 so as to include two or more bends and maintain optical fiber 2 in this state. Moreover, since fail-safe mechanism 1A includes load bearing component 20, the magnitude of a load to which optical fiber 2 is subjected can be converted into an amount of displacement. With this, when optical fiber 2 is subjected to a load greater than or equal to a predetermined magnitude, such as by being pulled, core 2a of optical fiber 2 can be broken and severed with certainty in the vicinity of tip end 104a of protrusion 104 provided in breaking structure 10A, and laser light emitting from the severed surface of optical fiber 2 can be aimed at a wall defining space 103A. In this way, fail-safe mechanism 1A prevents laser light from leaking out when optical fiber 2 is subjected to a load, such as when optical fiber 2 is pulled.

(Advantageous Effects, Etc.)

As described above, according to this embodiment, lighting device 5, which is configured to accommodate optical fiber 2, includes breaking structure 10A which accommodates a portion of optical fiber 2 in a state in which the portion includes two or more bends. Breaking structure 10A is characterized in that it breaks and severs the portion when optical fiber 2 is subjected to a load of a predetermined magnitude.

Here, breaking structure 10A includes space 103A including first aperture 101A and second aperture 102A, and when a portion of optical fiber 2 is disposed in breaking structure 10A, the portion passes through first aperture 101A and second aperture 102A. The distance from first aperture 101A to second aperture 102A in a view of space 103A from the perspective of first aperture 101A is greater than the sum of the diameter of first aperture 101A and the diameter of second aperture 102A.

Moreover, breaking structure 10A further includes hollow insertion through-hole 11A in communication with first aperture 101A and hollow extraction through-hole 12A in communication with second aperture 102A. When the portion is disposed in breaking structure 10A, the portion passes through insertion through-hole 11A and extraction through-hole 12A. Insertion through-hole 11A and extraction through-hole 12A are substantially parallel in the view of space 103A from the perspective of first aperture 101A.

With this configuration, when a portion of optical fiber 2 is disposed in lighting device 5 according to this embodiment, the axis of optical fiber 2 can be shifted by bending the portion of optical fiber 2 so as to include two or more bends and maintain optical fiber 2 in this state. This makes it possible to prevent laser light emitting from the severed surface of optical fiber 2 from leaking out from space 103 when optical fiber 2 is broken and severed in space 103 upon being subjected to a load greater than or equal to a predetermined magnitude, such as by being pulled.

Moreover, lighting device 5 further includes load bearing component 20, which is provided in space 121A in communication with second aperture 101A. When the portion is disposed in breaking structure 10A, load bearing component 20 holds optical fiber 2 and converts the magnitude of the load to which optical fiber 2 is subjected into an amount of displacement. Moreover, space 103A includes protrusion 104 including tip end 104a smaller than or equal in size to the critical radius of curvature of the optical fiber, and tip end 104a is disposed on a path of the portion when the portion is disposed in breaking structure 10A, and increases the number of bends in the portion by at least one.

Here, when optical fiber 2 is subjected to a load of a predetermined magnitude, breaking structure 10A breaks and severs a portion of optical fiber 2 in the vicinity of tip end 104a of protrusion 104 as a result of load bearing component 20 moving optical fiber 2.

In this way, lighting device 5 according to this embodiment can break and sever, with certainty, core 2a of optical fiber 2 in the vicinity of tip end 104a of protrusion 104 provided in breaking structure 10A since core 2a is bent beyond its critical radius of curvature when optical fiber 2 is subjected to a load, such as by being pulled, greater than or equal to a predetermined magnitude. Then, the laser light emitting from the severed surface of optical fiber 2 can be aimed toward a wall defining space 103. In other words, lighting device 5 according to this embodiment includes a fail-safe mechanism that prevents laser light from leaking upon the optical fiber being subjected to a load, such as when the optical fiber is pulled.

This makes it possible to break and sever optical fiber 2 in a location where laser light cannot escape, before optical fiber 2 reaches a load that causes optical fiber 2 to break, such as by being pulled. This yields the advantageous effect of being able to ensure safety since laser light cannot escape, even when optical fiber 2 actually breaks.

Variation

Next, a variation of Embodiment 2 will be described.
(Fail-Safe Mechanism 1B)

Figure 3B:
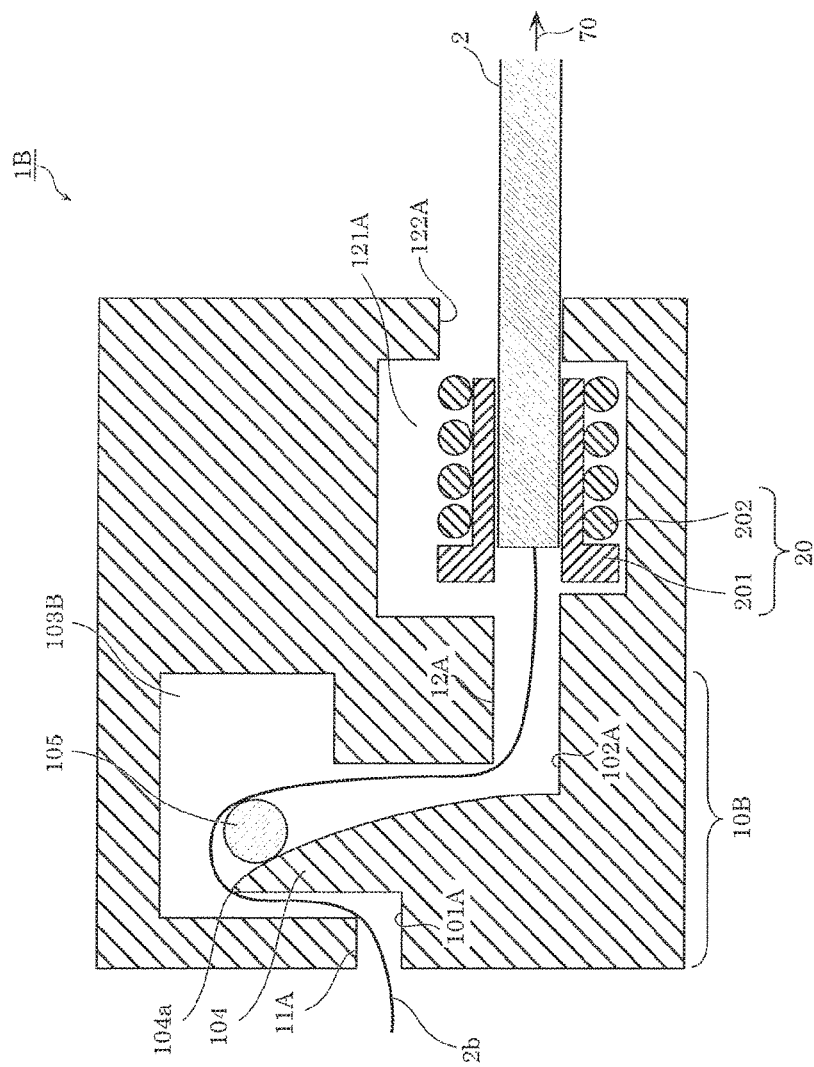
FIG. 3B is a cross sectional view of one example of the fail-safe mechanism according to a variation of Embodiment 2.

Next, fail-safe mechanism 1B according to this variation will be described in detail with reference to FIG. 3B. FIG. 3B is a cross sectional view of one example of fail-safe mechanism 1B according to a variation of Embodiment 2. Note that elements that are the same as in FIG. 3A share like reference signs, and detailed description thereof is omitted.

Fail-safe mechanism 1B illustrated in FIG. 3B includes breaking structure 10B, insertion through-hole 11A, extraction through-hole 12A, and load bearing component 20. Fail-safe mechanism 1B illustrated in FIG. 3B differs from fail-safe mechanism 1A illustrated in FIG. 3A in regard to the configuration of breaking structure 10B. More specifically, breaking structure 10B illustrated in FIG. 3B differs from breaking structure 10A illustrated in FIG. 3A in that breaking structure 10B includes slack adjuster 105. Note that in this variation as well, core 2b of optical fiber 2 is disposed in breaking structure 10B as "the portion" of optical fiber 2.

Breaking structure 10B accommodates core 2b of optical fiber 2 in a state in which core 2b includes two or more bends, and breaks and severs core 2b when optical fiber 2 is subjected to a load of a predetermined magnitude.

More specifically, as illustrated in, for example, FIG. 3B, breaking structure 10B includes space 103B including first aperture 101A and second aperture 102A.

Space 103B defines a space in fail-safe mechanism 1A and includes first aperture 10A and second aperture 102A. The space is defined by walls made of a material that shields laser light. Space 103B is in communication with hollow insertion through-hole 11A via first aperture 101A, and in communication with hollow extraction through-hole 12A via second aperture 102A.

Furthermore, space 103B includes protrusion 104 including tip end 104a smaller than or equal in size to the critical radius of curvature of optical fiber 2, and slack adjuster 105 that adjusts the slack at a bend in core 2b of optical fiber 2 to give the bend a radius greater than the critical radius of curvature of optical fiber 2. Tip end 104a and slack adjuster 105 are disposed on a path of core 2b of optical fiber 2 when core 2b is disposed in breaking structure 10B, and increase the number of bends in core 2b by at least one. In other words, when core 2b of optical fiber 2 is disposed in fail-safe mechanism 1B, space 103B adjusts the slack at a bend in core 2b of optical fiber 2 with slack adjuster 105 to give the bend a radius greater than the critical radius of curvature of optical fiber 2, and bends core 2a in the vicinity of tip end 104a of protrusion 104. With this, core 2b of optical fiber 2 exceeds its critical radius of curvature in the vicinity of tip end 104a of protrusion 104 and is broken and severed. Then, the walls defining space 103B prevent laser light emitted from the severed surface of core 2b of optical fiber 2 from leaking out.

Note that other elements, namely first aperture 101A, second aperture 102A, insertion through-hole 11A, extraction through-hole 12A, space 121A, third aperture portion 122A, and load bearing component 20 have the same configuration as described above, and as such, description thereof is omitted.
(Advantageous Effects, Etc.)

As described above, according to this variation, space 103B further includes, on a path of a portion of optical fiber 2 when the portion is disposed in breaking structure 10B, slack adjuster 105 that adjusts the slack at a bend in the portion of optical fiber 2 to give the bend a radius greater than the critical radius of curvature of optical fiber 2.

Here, when optical fiber 2 is subjected to a load of a predetermined magnitude, breaking structure 10B breaks and severs a portion of optical fiber 2 in the vicinity of tip end 104a of protrusion 104 as a result of load bearing component 20 moving optical fiber 2.

In this way, when optical fiber 2 to is subjected to a load greater than or equal to a predetermined magnitude, such as by being pulled, lighting device 5 according to this variation can break and sever core 2*b* of optical fiber 2 with certainty in the vicinity of tip end 104*a* of protrusion 104 provided in breaking structure 10B, and laser light emitting from the severed surface of optical fiber 2 can be aimed at a wall defining space 103B. In other words, lighting device 5 according to this variation can include a fail-safe mechanism that prevents laser light from leaking upon the optical fiber being subjected to a load, such as when the optical fiber is pulled.

This makes it possible to break and sever optical fiber 2 in a location where laser light cannot escape, before optical fiber 2 reaches a load that causes optical fiber 2 to break, such as by being pulled. This yields the advantageous effect of being able to ensure safety since laser light cannot escape, even when optical fiber 2 actually breaks.

Embodiment 3

In Embodiment 3, an example different from the fail-safe mechanisms described in Embodiment 1 and Embodiment 2 will be described. Note that since the overall configuration of lighting device 5 is the same as in Embodiment 1, description thereof is omitted. Moreover, the following description will focus points different from Embodiments 1 and 2.

(Fail-Safe Mechanism 1C)

Figure 4:
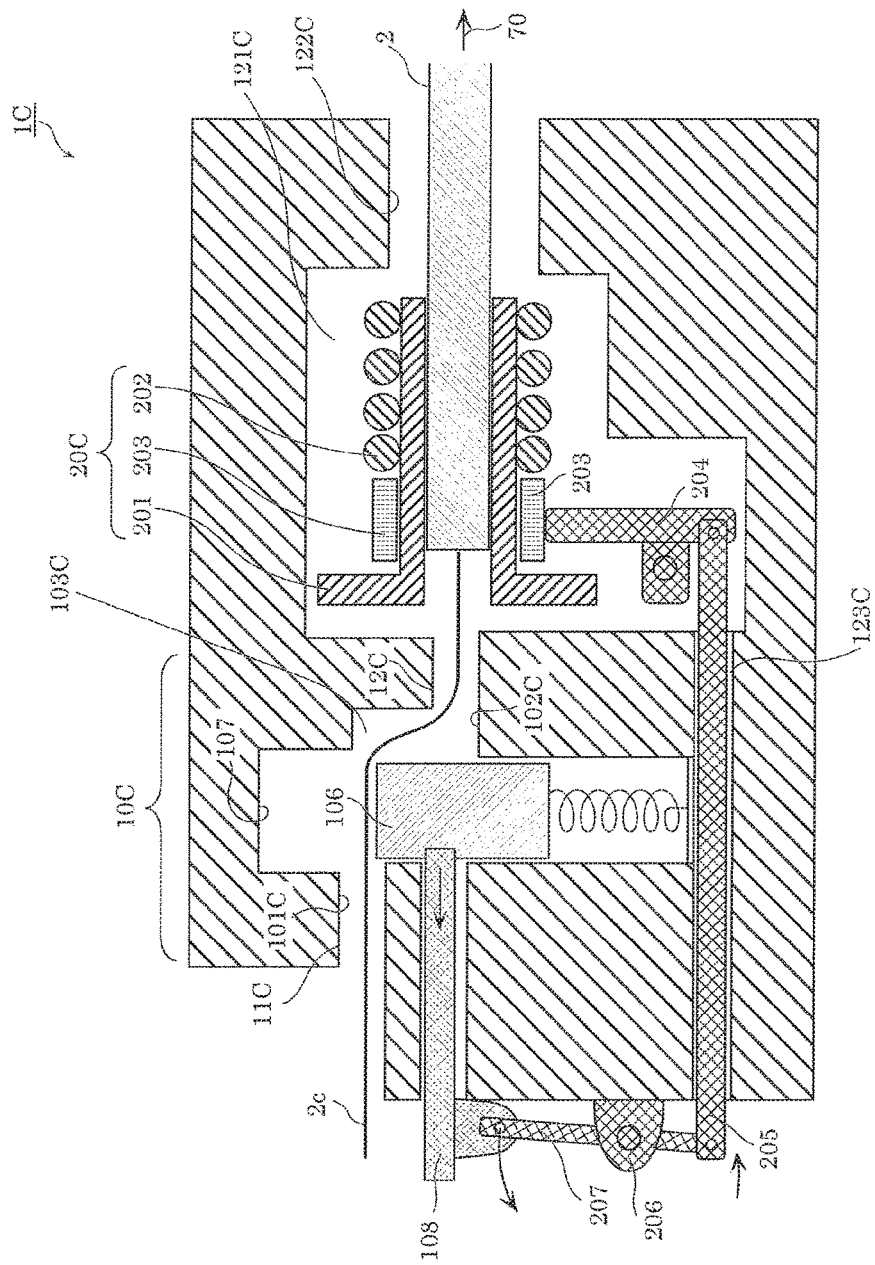
FIG. 4 is a cross sectional view of one example of the fail-safe mechanism according to Embodiment 3.

Next, fail-safe mechanism 1C according to this embodiment will be described in detail with reference to FIG. 4. FIG. 4 is a cross sectional view of one example of fail-safe mechanism 1C according to Embodiment 3. Note that elements that are the same as in FIG. 3A and FIG. 3B share like reference signs, and detailed description thereof is omitted.

Fail-safe mechanism 1C illustrated in FIG. 4 includes breaking structure 10C, insertion through-hole 11C, and extraction through-hole 12C, and load bearing component 20C. Note that in this embodiment, the outer layer (sheath) of optical fiber 2 is held by load bearing component 20C (to be described later), and core 2*c* of optical fiber 2 is disposed in breaking structure 10C as "the portion" of optical fiber 2.

Breaking structure 10C accommodates core 2*c* of optical fiber 2 in a state in which core 2*c* includes two or more bends, and breaks and severs core 2*c* when optical fiber 2 is subjected to a load of a predetermined magnitude.

More specifically, as illustrated in, for example, FIG. 4, breaking structure 10C includes space 103C including first aperture 101C and second aperture 102C.

Space 103C defines a space in fail-safe mechanism 1C and includes first aperture 101C and second aperture 102C. The space is defined by walls made of a material that shields laser light. Space 103C is in communication with hollow insertion through-hole 11C via first aperture 101C, and in communication with hollow extraction through-hole 12C via second aperture 102C.

Furthermore, space 103C includes punch 106, die 107, and a portion of trigger 108.

Trigger 108 operates in accordance with the amount of displacement converted by load bearing component 20C. Moreover, trigger 108 engages punch 106. When optical fiber 2 is subjected to a load of a predetermined magnitude, trigger 108 disengages punch 106 in accordance with the amount of displacement converted by load bearing component 20C. Note that it is sufficient if the portion of trigger 108 that functionally engages punch 106 be disposed in space 103C; the entire trigger 108 need not be disposed in space 103C. However, of course, the entirety of trigger 108 may be disposed in space 103C. Die 107 is a component for receiving a punch. Punch 106 is connected to an elastic body, such as a spring, and is loaded with a pushing force by the elastic body when engaged by trigger 108. Punch 106 is disposed on the path of core 2*c* of optical fiber 2 when core 2*c* is disposed in breaking structure 10C, and when disengaged by trigger 108, punch 106 travels toward die 107. With this, punch 106 can break and sever core 2*c* by pinching core 2*c* of optical fiber 2 against die 107 and causing core 2*c* to exceed its critical radius of curvature.

Note that since first aperture 101C, second aperture 102C, insertion through-hole 11C, and extraction through-hole 12C have the same structure and function as first aperture 101A, second aperture 102A, insertion through-hole 11A, and extraction through-hole 12A described above, description thereof is omitted.

Load bearing component 20C is provided in space 121C in communication with second aperture 101C. When core 2*c* of optical fiber 2 is disposed in breaking structure 10C, load bearing component 20C holds optical fiber 2 and converts the magnitude of the load to which optical fiber 2 is subjected into an amount of displacement.

In this embodiment, similar to Embodiment 2, load bearing component 20C is provided in space 121C which includes third aperture portion 122C in communication with extraction through-hole 12C which continues to second aperture 101C. Here, the diameter of third aperture portion 122C is greater than the diameter of optical fiber 2, and when core 2*c* of optical fiber 2 is disposed in breaking structure 10C, core 2*c* passes through third aperture portion 122C. Moreover, as illustrated in FIG. 4, load bearing component 20C includes support 201, spring 202 and component 203.

Support 201 is, for example, as described above, a sheath tube, and when core 2*c* of optical fiber 2 is disposed in breaking structure 10C, holds the covering (sheath) of optical fiber 2. Moreover, when optical fiber 2 is under load, such as when optical fiber 2 is pulled, spring 202 converts the magnitude of the load to which optical fiber 2 is subjected into an amount of displacement of support 201 in the direction indicated by arrow 70 in FIG. 4.

Component 203 causes trigger 108 to operate in accordance with the amount of displacement converted by load bearing component 20C, by transferring the amount of displacement converted by load bearing component 20C to a link mechanism. In the example illustrated in FIG. 4, the link mechanism includes component 204, component 205, component 206, and component 207. Component 205 is provided in space 121C provided in fail-safe mechanism 1C and in space 123C in communication with space 121C. Component 204 is provided in space 121C. The link mechanism illustrated in FIG. 4 transfers, to trigger 108, the amount of displacement transferred by component 203, in a direction opposite the orientation of the amount of displacement.

Using such a link mechanism makes it possible for load bearing component 20C to operate trigger 108 in accordance with the amount of displacement converted by load bearing component 20C when optical fiber 2 is subjected to a load of a predetermined magnitude, so as to pull trigger 108 in the opposite direction of the direction indicated by arrow 70, and disengage trigger 108 from punch 106.

Since fail-safe mechanism 1C configured as described above includes breaking structure 10C which allows for core 2*c* of optical fiber 2 to be routed through insertion through-hole 11C and first aperture 101C as well as extraction through-hole 12C and second aperture 102C, the axis of optical fiber 2 can be shifted by bending core 2*c* of optical fiber 2 so as to include two or more bends and maintain optical fiber 2 in this state. Moreover, since fail-safe mechanism 1C includes load bearing component 20C, the magnitude of a load to which optical fiber 2 is subjected can be converted into an amount of displacement. Therefore, when optical fiber 2 is subjected to a load greater than or equal to a predetermined magnitude, such as by being pulled, trigger 108 can be pulled in accordance with the amount of displacement of load bearing component 20C to disengage punch 107. With this, core 2c of optical fiber 2 can be broken and severed with certainty in the vicinity in which core 2c of optical fiber 2 is pinched between punch 106 and die 107 in breaking structure 10C, and laser light emitting from the severed surface of optical fiber 2 can be aimed at a wall defining space 103C. In this way, fail-safe mechanism 1C can prevent laser light from leaking out when optical fiber 2 is subjected to a load, such as when optical fiber 2 is pulled.

(Advantageous Effects, Etc.)

As described above, according to this embodiment, lighting device 5, which is configured to accommodate optical fiber 2, includes breaking structure 10C which accommodates a portion of optical fiber 2 in a state in which the portion includes two or more bends. Breaking structure 10C is characterized in that it breaks and severs the portion when optical fiber 2 is subjected to a load of a predetermined magnitude.

Here, breaking structure 10C includes space 103C including first aperture 101C and second aperture 102C, and when a portion of optical fiber 2 is disposed in breaking structure 10C, the portion passes through first aperture 101C and second aperture 102C. The distance from first aperture 101C to second aperture 102C in a view of space 103C from the perspective of first aperture 101C is greater than the sum of the diameter of first aperture 101C and the diameter of second aperture 102C.

Moreover, breaking structure 10C further includes hollow insertion through-hole 11C in communication with first aperture 101C and hollow extraction through-hole 12C in communication with second aperture 102C, and when the portion is disposed in breaking structure 10C, the portion passes through insertion through-hole 11C and extraction through-hole 12C. Insertion through-hole 11C and extraction through-hole 12C are substantially parallel in the view of space 103C from the perspective of first aperture 101C.

With this configuration, when a portion of optical fiber 2 is disposed in lighting device 5 according to this embodiment, the axis of optical fiber 2 can be shifted by bending the portion of optical fiber 2 so as to include two or more bends and maintain optical fiber 2 in this state. This makes it possible to prevent laser light emitting from the severed surface of optical fiber 2 from leaking out from space 103C when optical fiber 2 is broken and severed in space 103C upon being subjected to a load greater than or equal to a predetermined magnitude, such as by being pulled.

Moreover, lighting device 5 further includes load bearing component 20C, which is provided in space 121C in communication with second aperture 102C. When the portion is disposed in breaking structure 10C, load bearing component 20C holds optical fiber 2 and converts the magnitude of the load to which optical fiber 2 is subjected into an amount of displacement. Further provided in space 103C are: trigger 108 that operates in accordance with the amount of displacement converted by load bearing component 20C; punch 106 connected to an elastic body and loaded with a pushing force by the elastic body when engaged by trigger 108; and die 107 for receiving punch 106. When optical fiber 2 is subjected to the load of the predetermined magnitude, load bearing component 20C displaces optical fiber 2 and trigger 108 operates in accordance with the amount of displacement converted by load bearing component 20C to disengage punch 106, causing breaking structure 10C to pinch a portion of optical fiber 2 between punch 106 and die 107.

Here, when optical fiber 2 is subjected to a load of a predetermined magnitude, breaking structure 10C breaks and severs a portion of optical fiber 2 in the vicinity of the region pinched by punch 106 and die 107.

In this way, lighting device 5 according to this embodiment can, with certainty, break and sever core 2c of optical fiber 2 in the vicinity of the region pinched by punch 106 and die 107 in breaking structure 10C when optical fiber 2 is subjected to a load greater than or equal to a predetermined magnitude, such as by being pulled, and laser light emitting from the severed surface of optical fiber 2 can be aimed toward a wall defining space 103C. In other words, lighting device 5 according to this embodiment includes a fail-safe mechanism that prevents laser light from leaking upon the optical fiber being subjected to a load, such as when the optical fiber is pulled.

This makes it possible to break and sever optical fiber 2 in a location where laser light cannot escape, before optical fiber 2 reaches a load, such as being pulled, that cause optical fiber 2 to break. This yields the advantageous effect of being able to ensure safety since laser light cannot escape, even when optical fiber 2 actually breaks.

Embodiment 4

Embodiment 3 describes an example of a fail-safe mechanism including a punch and die, but this example is not limiting. In Embodiment 4, an example different from the fail-safe mechanism including a punch and die described in Embodiment 3 will be described. Note that since the overall configuration of lighting device 5 is the same as in Embodiment 1, description thereof is omitted. Moreover, the following description will focus on points different from Embodiment 3.

(Fail-Safe Mechanism 1D)

Figure 5:
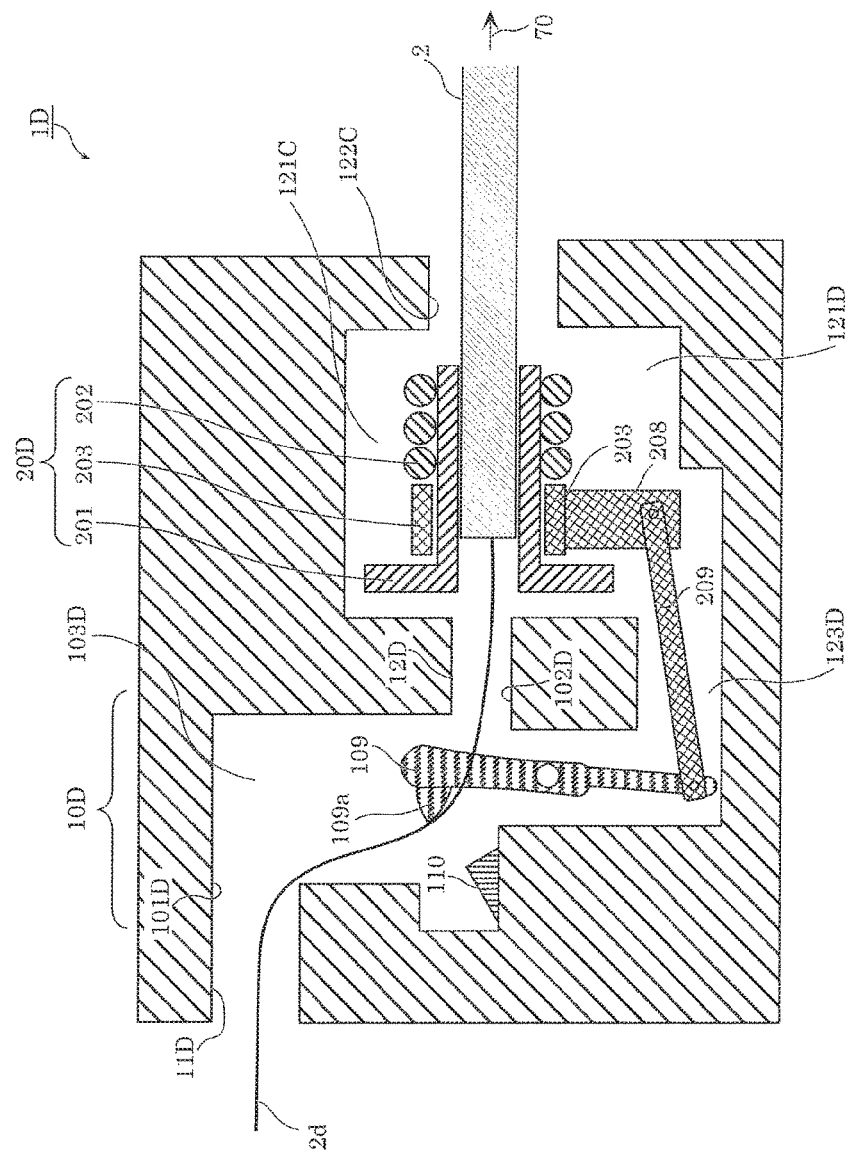
FIG. 5 is a cross sectional view of one example of the fail-safe mechanism according to Embodiment 4.

Next, fail-safe mechanism 1D according to this embodiment will be described in detail with reference to FIG. 5. FIG. 5 is a cross sectional view of one example of fail-safe mechanism 1) according to Embodiment 4. Note that elements that are the same as in FIG. 4 share like reference signs, and detailed description thereof is omitted.

Fail-safe mechanism 1D illustrated in FIG. 5 includes breaking structure 10D, insertion through-hole 11D, and extraction through-hole 12D, and load bearing component 20D. Breaking structure 10D illustrated in FIG. 5 differs from breaking structure 10C illustrated in FIG. 4 in that breaking structure 10D does not include trigger 108 and the structures of punch 109 and die 110 are different. Note that in this embodiment, the outer layer (sheath) of optical fiber 2 is held by load bearing component 20D (to be described later), and core 2d of optical fiber 2 is disposed in breaking structure 10D as "the portion" of optical fiber 2.

Similar to breaking structure 10C, breaking structure 10D accommodates core 2d of optical fiber 2 in a state in which core 2d includes two or more bends, and breaks and severs core 2d when optical fiber 2 is subjected to a load of a predetermined magnitude.

More specifically, as illustrated in, for example, FIG. 5, breaking structure 10D includes space 1031) including first aperture 101D and second aperture 102D.

Space 103D defines a space in fail-safe mechanism 1D and includes first aperture 101D and second aperture 102D. The space is defined by walls made of a material that shields laser light. Space 103D is in communication with hollow insertion through-hole 11D via first aperture 101D, and in communication with hollow extraction through-hole 12D via second aperture 102D.

Furthermore, space 103D includes punch 109 and die 110.

Punch 109 includes protrusion 109a and operates in accordance with the amount of displacement converted by load bearing component 20D.

Protrusion 109a is disposed in the vicinity of the path of core 2d when core 2d is disposed in breaking structure 10D, and as illustrated in FIG. 5, increases the number of bends in core 2d by at least one. Die 110 is a component for receiving protrusion 109a of punch 109.

When optical fiber 2 is subjected to a load of a predetermined magnitude, punch 109 operates in accordance with the amount of displacement converted by load bearing component 20D, and protrusion 109a of punch 109 contacts die 110. In other words, when optical fiber 2 is subjected to a load of a predetermined magnitude, punch 109 operates in accordance with the amount of displacement converted by load bearing component 20D, and pinches core 2c of optical fiber 2 against die 107. Since this causes core 2c to exceed its critical radius of curvature, core 2c breaks and severs.

Note that description of space 121D is omitted here since it is similar to space 121C. Compared to space 121C, space 121D is configured to not interfere with the movement of link mechanism.

In this embodiment, the link mechanism includes component 208 and component 209, as illustrated in FIG. 5. Component 209 is provided in space 121D provided in fail-safe mechanism 1D and in space 123D in communication with space 121D. Component 204 is provided in 122C. As illustrated in FIG. 5, the link mechanism transfers, to an end of punch 109 opposite the end at which protrusion 109a is located, the amount of displacement transferred by component 203.

In this way, when optical fiber 2 is subjected to a load of a predetermined magnitude, load bearing component 20D causes protrusion 109a of punch 109 to contact die 110 in accordance with the amount of displacement converted by load bearing component 20D and punch 109.

Since fail-safe mechanism 1D configured as described above includes breaking structure 10D which allows for core 2d of optical fiber 2 to be routed through insertion through-hole 11D and first aperture 101D as well as extraction through-hole 12D and second aperture 102D, the axis of optical fiber 2 can be shifted by bending the portion of optical fiber 2 so as to include two or more bends and maintain optical fiber 2 in this state. Moreover, since fail-safe mechanism 1D includes load bearing component 20D, the magnitude of a load to which optical fiber 2 is subjected can be converted into an amount of displacement. Therefore, when optical fiber 2 is subjected to a load greater than or equal to a predetermined magnitude, such as by being pulled, punch 109 can be displaced in accordance with the amount of displacement of load bearing component 20D to cause protrusion 109a of punch 109 to contact die 110. With this, core 2d of optical fiber 2 can be broken and severed with certainty in the vicinity in which core 2d of optical fiber 2 is pinched between punch 109 and die 110 in breaking structure 10D, and laser light emitting from the severed surface of optical fiber 2 can be aimed at a wall defining space 103D. In this way, fail-safe mechanism 1D can prevent laser light from leaking out when optical fiber 2 is subjected to a load, such as when optical fiber 2 is pulled.

(Advantageous Effects, Etc.)

As described above, according to this embodiment, lighting device 5, which is configured to accommodate optical fiber 2, includes breaking structure 10D which accommodates a portion of optical fiber 2 in a state in which the portion includes two or more bends. Breaking structure 10D is characterized in that it breaks and severs the portion when optical fiber 2 is subjected to a load of a predetermined magnitude.

Here, breaking structure 10D includes space 103D including first aperture 101D and second aperture 102D, and when the portion of optical fiber 2 is disposed in breaking structure 10D, the portion passes through first aperture 101D and second aperture 102D. The distance from first aperture 101D to second aperture 102D in a view of space 103D from the perspective of first aperture 101D is greater than the sum of the diameter of first aperture 101D and the diameter of second aperture 102D.

Moreover, breaking structure 10D further includes hollow insertion through-hole 11D in communication with first aperture 101D and hollow extraction through-hole 12D in communication with second aperture 102D, and when the portion is disposed in breaking structure 10D, the portion passes through insertion through-hole 11D and extraction through-hole 12D. Insertion through-hole 11D and extraction through-hole 12D are substantially parallel in the view of space 103D from the perspective of first aperture 101D.

With this configuration, when a portion of optical fiber 2 is disposed in lighting device 5 according to this embodiment, the axis of optical fiber 2 can be shifted by bending the portion of optical fiber 2 so as to include two or more bends and maintain optical fiber 2 in this state. This makes it possible to prevent laser light emitting from the severed surface of optical fiber 2 from leaking out from space 103D when optical fiber 2 is broken and severed in space 103D upon being subjected to a load greater than or equal to a predetermined magnitude, such as by being pulled.

Moreover, lighting device 5 further includes load bearing component 20D, which is provided in space 121D in communication with second aperture 101D. When the portion is disposed in breaking structure 10D, load bearing component 20D holds optical fiber 2 and converts the magnitude of the load to which optical fiber 2 is subjected into an amount of displacement. Moreover, further provided in space 103D is punch 109 and die 110. Punch 109 includes protrusion 109a that contacts a portion of optical fiber 2 when the portion is disposed in breaking structure 10D and operates in accordance with the amount of displacement converted by load bearing component 20D. Die 110 is a component for receiving protrusion 109a of punch 109. In breaking structure 10D, when optical fiber 2 is subjected to a load of a predetermined magnitude, load bearing component 20D displaces optical fiber 2, punch 109 operates in accordance with the amount of displacement converted by load bearing component 20D, and die 110 receives protrusion 109a of punch 109.

Here, when optical fiber 2 is subjected to a load of a predetermined magnitude, breaking structure 10D breaks and severs a portion of optical fiber 2 in the vicinity of protrusion 109a by die 110 receiving protrusion 109a.

In this way, lighting device 5 according to this embodiment can, with certainty, break and sever core 2d of optical fiber 2 in the vicinity of the region pinched by punch 109 and die 110 in breaking structure 10D when optical fiber 2 is subjected to a load greater than or equal to a predetermined magnitude, such as by being pulled, and laser light emitting from the severed surface of optical fiber 2 can be aimed toward a wall defining space 103D. In other words, lighting device 5 according to this embodiment includes a fail-safe mechanism that prevents laser light from leaking upon the optical fiber being subjected to a load, such as when the optical fiber is pulled.

This makes it possible to break and sever optical fiber 2 in a location where laser light cannot escape, before optical fiber 2 reaches a load, such as being pulled, that cause optical fiber 2 to break. This yields the advantageous effect of being able to ensure safety since laser light cannot escape, even when optical fiber 2 actually breaks.

Variation

Next, a variation of Embodiment 4 will be described.

Figure 6:
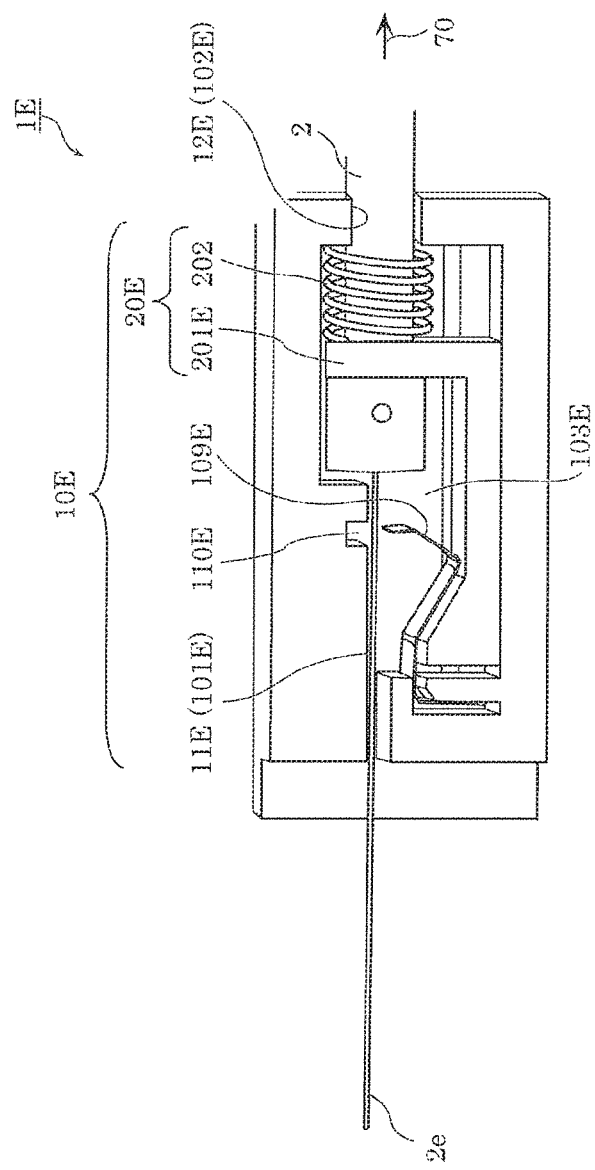
FIG. 6 is a cross sectional view of one example of the fail-safe mechanism according to a variation of Embodiment 4.

FIG. 6 is a cross sectional view of one example of fail-safe mechanism 1E according to a variation of Embodiment 4. Note that elements that are the same as in FIG. 5 share like reference signs, and detailed description thereof is omitted.

Fail-safe mechanism 1E illustrated in FIG. 6 includes breaking structure 10E, insertion through-hole 11E, and extraction through-hole 12E. Fail-safe mechanism 1E illustrated in FIG. 6 differs from fail-safe mechanism 1D illustrated in FIG. 5 in regard to the configuration of breaking structure 10E.

More specifically, as illustrated in FIG. 6, breaking structure 10E, includes space 103E which includes first aperture 101E and second aperture 102E, but first aperture 101E and second aperture 102E are positioned such that first aperture 101E, second aperture 10E, and core 2e of optical fiber 2 are substantially axially aligned when core 2e of optical fiber 2 is disposed in fail-safe mechanism 1E.

Moreover, in addition to punch 109E and die 110E, load bearing component 20E is provided in space 103E.

When optical fiber 2 is subjected to a load of a predetermined magnitude, punch 109E operates in accordance with the amount of displacement converted by load bearing component 20E, and protrusion 109a of punch 109E contacts die 110E. Die 110E is a component for receiving the tip end of punch 109E.

Moreover, as illustrated in FIG. 6, load bearing component 20E includes support 201E and spring 202. Support 201E holds the covering (sheath) of optical fiber 2 when core 2e of optical fiber 2 is disposed in fail-safe mechanism 1E. Moreover, support 201E also functions as a link mechanism. When optical fiber 2 is subjected to a load, such as by being pulled, spring 202 converts the magnitude of the load into an amount of displacement of support 201E in the direction indicated by arrow 70 in FIG. 6. Therefore, when optical fiber 2 is subjected to a load of a predetermined magnitude, load bearing component 20E causes support 201E to lift the tip end of punch 109E up and contact die 110E in accordance with the amount of displacement converted by load bearing component 20E.

In this way, lighting device 5 according to this variation can, with certainty, break and sever core 2e of optical fiber 2 in the vicinity of the region pinched by punch 109E and die 110E in breaking structure 10E when optical fiber 2 is subjected to a load greater than or equal to a predetermined magnitude, such as by being pulled, and laser light emitting from the severed surface of optical fiber 2 can be aimed toward a wall defining space 103E. In other words, lighting device 5 according to this variation can include a fail-safe mechanism that prevents laser light from leaking upon the optical fiber being subjected to a load, such as when the optical fiber is pulled.

Embodiment 5

In the variation of Embodiment 4, the load bearing component is provided in the breaking structure, but this example is not limiting. In Embodiment 5, an example of a fail-safe mechanism that includes a load bearing component in the breaking structure different from fail-safe mechanism described in the variation of Embodiment 4 will be described. Note that since the overall configuration of lighting device 5 is the same as in Embodiment 1, description thereof is omitted. Moreover, the following description will focus on points different from Embodiment 1.

(Fail-Safe Mechanism 1F)

Figure 7:
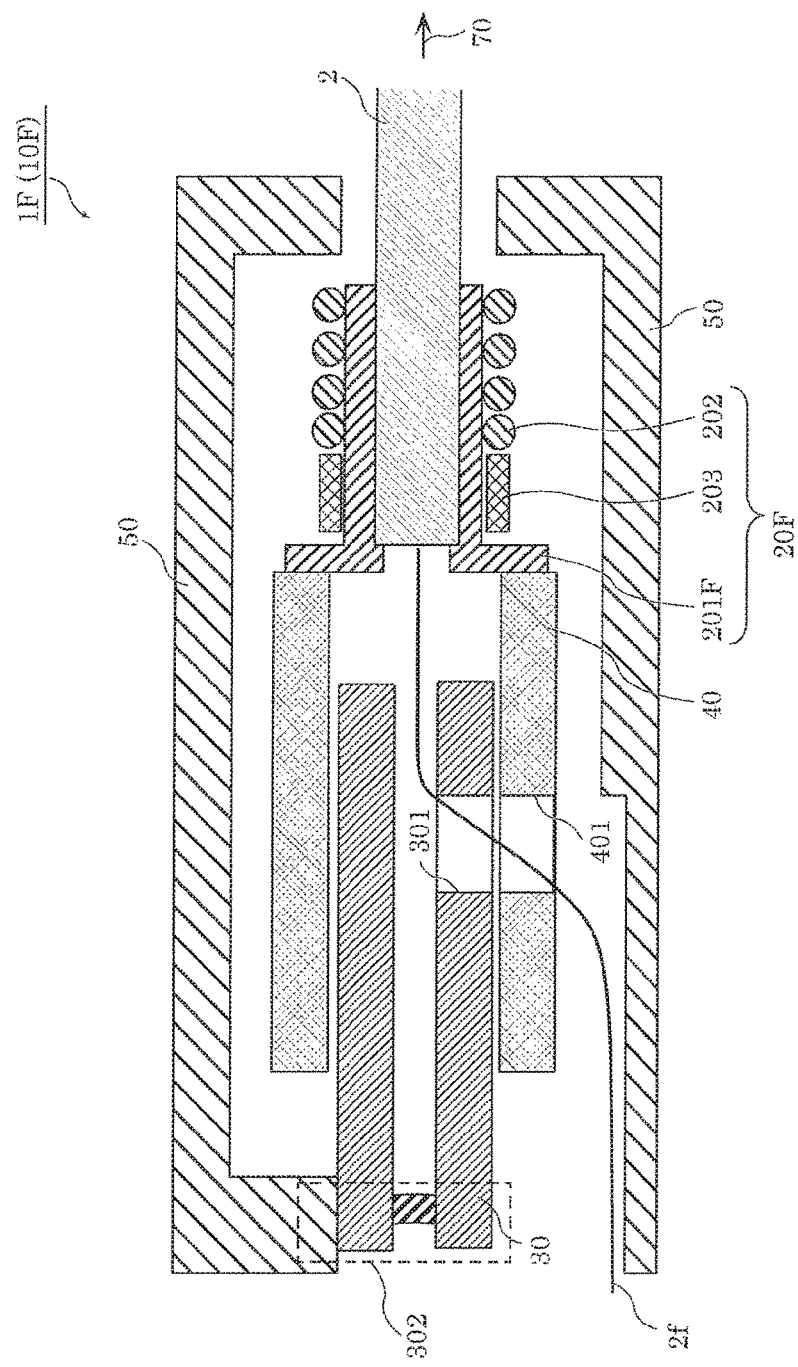
FIG. 7 is a cross sectional view of one example of the fail-safe mechanism according to Embodiment 5.

Next, fail-safe mechanism 1F according to this embodiment will be described in detail with reference to FIG. 7. FIG. 7 is a cross sectional view of one example of fail-safe mechanism 1F according to Embodiment 5. Note that elements that are the same as in FIG. 2 through FIG. 6 share like reference signs, and detailed description thereof is omitted.

Fail-safe mechanism 1F illustrated in FIG. 7 is made of sheet metal, and includes breaking structure 10F and case 50 surrounding breaking structure 10F.

Breaking structure 10F accommodates core 2f of optical fiber 2 in a state in which core 2f includes two or more bends, and breaks and severs core 2f when optical fiber 2 is subjected to a load of a predetermined magnitude. Breaking structure 10F is made of sheet metal and includes all elements illustrated in FIG. 7 excluding case 50 and optical fiber 2.

More specifically, breaking structure 10F includes, for example as illustrated in FIG. 7, first hollow tube 30, second hollow tube 40, and load bearing component 20F.

Load bearing component 20F is provided in breaking structure 10F. When optical fiber 2 is disposed in fail-safe mechanism 1F, load bearing component 20F holds optical fiber 2 and converts the magnitude of the load to which optical fiber 2 is subjected into an amount of displacement. Moreover, as illustrated in FIG. 7, load bearing component 20F includes: support 201F joined to second hollow tube 40; spring 202; and component 203. Support 201F holds the covering (sheath) of optical fiber 2 when optical fiber 2 is disposed in fail-safe mechanism 1F. Note that since support 201F is joined to second hollow tube 40, load bearing component 20 may be a portion of second hollow tube 40.

First hollow tube 30 has first aperture 301 in a side surface. Among the two ends of first hollow tube 30, first end 302 is closed. Moreover, first hollow tube 30 is fixed at first end 302. First aperture 301 is larger in diameter than core 2f of optical fiber 2. First hollow tube 30 is inserted into second hollow tube 40 such that an end of first hollow tube 30 opposite first end 302 is inserted into an end of second hollow tube 40 opposite an end joined to load bearing component 20F that holds optical fiber 2.

Second hollow tube 40 has second aperture 401 in a side surface, and is larger in diameter than first hollow tube 30. Second aperture 401 is larger in diameter than core 2f of optical fiber 2.

Second aperture 401 of second hollow tube 40 is provided in a position corresponding to first aperture 301, and when optical fiber 2 is disposed in fail-safe mechanism 1F, core 2f of optical fiber 2 passes through second aperture 401 of second hollow tube 40. In other words, when optical fiber 2 is disposed in fail-safe mechanism 1F, core 2f of optical fiber 2 passes through first hollow tube 30 via first aperture 301 and second aperture 401, and is led out of case 50.

When optical fiber 2 is subjected to a load of a predetermined magnitude, breaking structure 10F configured as described above displaces second hollow tube 40 to place second aperture 401 in a position that does not align with first aperture 301.

In this way, when optical fiber 2 is subjected to a load greater than or equal to a predetermined magnitude, such as by being pulled, fail-safe mechanism 1F can displace second aperture 401 to a position that does not align with first aperture 301 and pinch core 2f of optical fiber 2 between second aperture 401 and first aperture 301 and causing core 2f of optical fiber 2 to exceed its critical radius of curvature. Accordingly, fail-safe mechanism if can break and sever the portion in a vicinity of first aperture 301 and aim laser light emitting from the severed surface of core 2f of optical fiber 2 at a wall of first hollow tube 30. In this way, fail-safe mechanism 1F can prevent laser light from leaking out when optical fiber 2 is subjected to a load, such as when optical fiber 2 is pulled.

(Advantageous Effects, Etc.)

As described above, according to this embodiment, lighting device 5, which is configured to accommodate optical fiber 2, includes breaking structure 10F which accommodates a portion of optical fiber 2 in a state in which the portion includes two or more bends. Breaking structure 10F is characterized in that it breaks and severs the portion when optical fiber 2 is subjected to a load of a predetermined magnitude.

Moreover, breaking structure 10F includes first hollow tube 30 and second hollow tube 40. First hollow tube 30 has first aperture 301 in a side surface. Among the two ends of first hollow tube 30, first end 302 is closed. Moreover, first hollow tube 30 is fixed at first end 302. Second hollow tube 40 is larger in diameter than first hollow tube 30, has second aperture 401 in a side surface, holds optical fiber 2 and converts a magnitude of a load to which optical fiber 2 is subjected into an amount of displacement. First hollow tube 30 is inserted into second hollow tube 40 such that an end of first hollow tube 30 opposite first end 302 is inserted into an end of second hollow tube 40 opposite an end at which optical fiber 2 is held. When the portion is disposed in breaking structure 10F, first aperture 301 and second aperture 401 are aligned, and the portion passes through first aperture 301 and second aperture 401. When optical fiber 2 is subjected to a load of a predetermined magnitude, breaking structure 10F displaces second hollow tube 40 to place second aperture 401 in a position that does not correspond to first aperture 301.

Here, when optical fiber 2 is subjected to a load of a predetermined magnitude, breaking structure 10F breaks and severs the portion of optical fiber 2 in the vicinity of first aperture 301 by displacing second hollow tube 40 to place second aperture 401 in a position that does not correspond to first aperture 301.

In this way, lighting device 5 according to this embodiment can break and sever the portion in the vicinity of first aperture 301 by displacing second hollow tube 40 to place second aperture 401 in a position that does not correspond to first aperture 301 when optical fiber 2 is subjected to a load of a predetermined magnitude, and can aim the laser light emitting from the severed surface of core 2f of optical fiber 2 at a wall of first hollow tube 30. In other words, lighting device 5 according to this embodiment includes a fail-safe mechanism that prevents laser light from leaking upon the optical fiber being subjected to a load, such as when the optical fiber is pulled.

This makes it possible to break and sever optical fiber 2 in a location where laser light cannot escape, before optical fiber 2 reaches a load, such as being pulled, that cause optical fiber 2 to break. This yields the advantageous effect of being able to ensure safety since laser light cannot escape, even when optical fiber 2 actually breaks.

Variation

Next, a variation of Embodiment 5 will be described.

Figure 8:
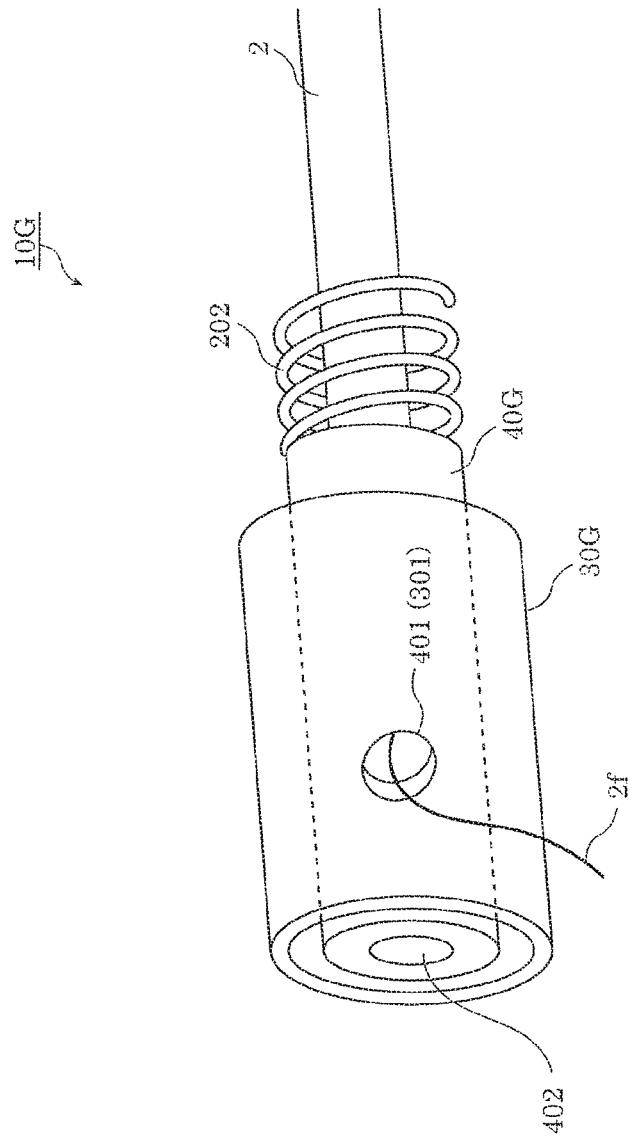
FIG. 8 is an external view of one example of the fail-safe mechanism according to a variation of Embodiment 5.

FIG. 8 is an external view of one example of breaking structure 10G according to a variation of Embodiment 5. Note that elements that are the same as in FIG. 7 share like reference signs, and detailed description thereof is omitted.

Breaking structure 10G illustrated in FIG. 8 differs from breaking structure 10F illustrated in FIG. 7 in regard to the diameters of first hollow tube 30G and second hollow tube 40G. Neither of the two ends of first hollow tube 30G is closed, and end 402 of second hollow tube 40G is closed.

Since the configurations of other elements are the same as described in Embodiment 5, the same advantageous effects achieved by Embodiment 5 are achieved by this variation, and as such, detailed description is omitted.

OTHER EMBODIMENTS, ETC

Hereinbefore, a lighting device according to the present disclosure has been described based on Embodiments 1 through 5 and variations thereof, but the present disclosure is not limited to the above embodiments and variations thereof. It goes without saying that each of the above embodiments is merely an example, and various modifications, additions, and omissions may be made.

Figure 9:
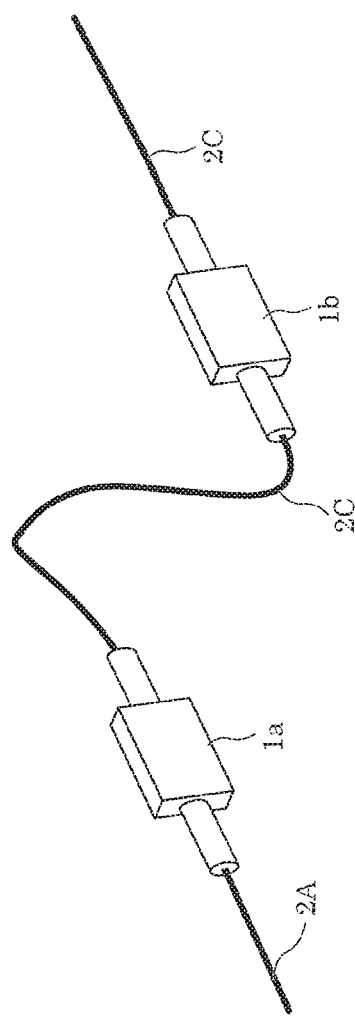
FIG. 9 is an application example the fail-safe mechanism according to the present disclosure.

For example, as illustrated in FIG. 9, fail-safe mechanism 1 illustrated in FIG. 1 may be used in relay component 10 which optically connects optical fiber cord 2A and optical fiber cord 2C used in a line lamp, and may be included in interrupting fail-safe component 1b in which a portion of optical fiber cord 2B is inserted.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device configured to accommodate an optical fiber, the lighting device comprising:
   a breaking structure that includes a plurality of walls defining a space through which a portion of the optical fiber is passable, the space being configured to accommodate the portion of the optical fiber in a state in which the portion of the optical fiber includes two or more bends, wherein
   the breaking structure is configured to break and sever the portion of the optical fiber in the space when the optical fiber is subjected to a load of a predetermined magnitude, and as a fail-safe, trap, in the space, light that leaks from the portion of the optical fiber when the portion of the optical fiber is severed.

2. The lighting device according to claim 1, wherein
   the space includes a first aperture and a second aperture,
   when the portion of the optical fiber is disposed in the breaking structure, the portion of the optical fiber passes through the first aperture and the second aperture, and
   a distance from the first aperture to the second aperture in a view of the space from a perspective of the first aperture is greater than a sum of a diameter of the first aperture and a diameter of the second aperture.

3. The lighting device according to claim 2, wherein
   the breaking structure further includes:

an insertion through-hole that is in communication with the first aperture; and an extraction through-hole that is in communication with the second aperture, when the portion of the optical fiber is disposed in the breaking structure, the portion of the optical fiber passes through the insertion through-hole and the extraction through-hole, and the insertion through-hole and the extraction through-hole are substantially parallel in the view of the space from the perspective of the first aperture.

4. The lighting device according to claim 2, further comprising:

a load bearing component that is disposed in communication with the second aperture, holds the optical fiber when the portion is disposed in the breaking structure, and converts a magnitude of the load to which the optical fiber is subjected into an amount of displacement, wherein the space includes a protrusion having a tip end smaller than or equal in size to a critical radius of curvature of the optical fiber, and the tip end is disposed on a path of the portion when the portion is disposed in the breaking structure, and increases a number of the bends included in the portion by at least one.

5. The lighting device according to claim 4, wherein the space further includes, on the path of the portion when the portion is disposed in the breaking structure, a slack adjuster that adjusts slack in at least one bend among the bends in the portion to give the at least one bend a radius greater than the critical radius of curvature of the optical fiber.

6. The lighting device according to claim 4, wherein when the optical fiber is subjected to the load of the predetermined magnitude, the load bearing component displaces the optical fiber, causing the breaking structure to break and sever the portion in a vicinity of the tip end of the protrusion.

7. The lighting device according to claim 4, wherein the load bearing component includes a sheath tube and a spring, and when the portion is disposed in the breaking structure, the sheath tube holds the optical fiber.

8. The lighting device according to claim 2, further comprising:

a load bearing component that is disposed in communication with the second aperture, holds the optical fiber when the portion is disposed in the breaking structure, and converts a magnitude of the load to which the optical fiber is subjected into an amount of displacement, wherein the space further includes:

a trigger that operates in accordance with the amount of displacement converted by the load bearing component;

a punch connected to an elastic body, the punch being loaded with a pushing force by the elastic body when engaged by the trigger; and a die for receiving the punch, and when the optical fiber is subjected to the load of the predetermined magnitude, the load bearing component displaces the optical fiber and the trigger operates in accordance with the amount of displacement converted by the load bearing component to disengage the punch, causing the breaking structure to pinch the portion between the punch and the die.

9. The lighting device according to claim 8, wherein the breaking structure breaks and severs the portion in a vicinity of a region pinched by the punch and the die when the optical fiber is subjected to the load of the predetermined magnitude.

10. The lighting device according to claim 8, wherein the load bearing component is in communication with a third aperture, the load bearing component being between the second aperture and the third aperture, and a diameter of the third aperture is greater than the diameter of the second aperture.

11. The lighting device according to claim 2, further comprising:

a load bearing component that is disposed in communication with the second aperture, holds the optical fiber when the portion is disposed in the breaking structure, and converts a magnitude of the load to which the optical fiber is subjected into an amount of displacement, wherein the space further includes:

a punch including a protrusion that contacts the portion when the portion is disposed in the breaking structure, the punch operating in accordance with the amount of displacement converted by the load bearing component; and a die for receiving the protrusion of the punch, and when the optical fiber is subjected to the load of the predetermined magnitude, the load bearing component displaces the optical fiber, the punch operates in accordance with the amount of displacement converted by the load bearing component, and the die receives the protrusion of the punch.

12. The lighting device according to claim 11, wherein the breaking structure breaks and severs the portion in a vicinity of the protrusion by the die receiving the protrusion when the optical fiber is subjected to the load of the predetermined magnitude.

13. The lighting device according to claim 2, wherein the breaking structure comprises a material that shields laser light, the material defining the space.

14. The lighting device according to claim 2, wherein the diameter of the first aperture is equal to the diameter of the second aperture.

15. The lighting device according to claim 2, wherein the diameter of the first aperture is greater than the diameter of the second aperture.

16. The lighting device according to claim 2, wherein the space includes a protrusion having a tip end smaller than or equal in size to a critical radius of curvature of the optical fiber, and the tip end is disposed on a path of the portion when the portion is disposed in the breaking structure, and increases a number of the bends included in the portion by at least one.

17. The lighting device according to claim 2, further comprising:

a load bearing component that is disposed in communication with the second aperture, includes a sheath tube, and converts a magnitude of the load to which the optical fiber is subjected into an amount of displacement, wherein, when the portion is disposed in the breaking structure, the sheath tube holds an outer layer of the optical fiber and the portion of the optical fiber disposed in the breaking structure is a core of the optical fiber, the portion not including the outer layer of the optical fiber.

18. The lighting device according to claim 1, wherein the breaking structure includes:
- a first hollow tube having a first aperture in a side surface, having a first end among two ends that is closed, and being fixed at the first end; and
- a second hollow tube being larger in diameter than the first hollow tube, having a second aperture in a side surface, holding the optical fiber, and converting a magnitude of the load to which the optical fiber is subjected into an amount of displacement, the first hollow tube is in the second hollow tube with a second end of the first hollow tube opposite the first end being opposite an end of the second hollow tube at which the optical fiber is held, when the portion is disposed in the breaking structure, the first aperture and the second aperture are aligned, and the portion passes through the first aperture and the second aperture, and when the optical fiber is subjected to the load of the predetermined magnitude, the breaking structure displaces the second hollow tube to place the second aperture in a position that does not align with the first aperture.

19. The lighting device according to claim 18, wherein when the optical fiber is subjected to the load of the predetermined magnitude, the breaking structure breaks and severs the portion in a vicinity of the first aperture by displacing the second hollow tube to place the second aperture in the position that does not align with the first aperture.

20. The lighting device according to claim 1, further comprising:

the optical fiber.

* * * * *